United States Patent [19]

Bailey et al.

[11] Patent Number: 5,076,921
[45] Date of Patent: Dec. 31, 1991

[54] FILTERING SCREENS

[75] Inventors: Marshall G. Bailey, Banchory; George L. Souter, Aberdeen, both of Scotland

[73] Assignee: Rig Technology Limited, Aberdeen, Scotland

[21] Appl. No.: 461,237

[22] Filed: Jan. 5, 1990

[30] Foreign Application Priority Data

Aug. 12, 1987 [GB] United Kingdom ............... 8715917

[51] Int. Cl.$^5$ ..................... B01D 33/03; B01D 33/41
[52] U.S. Cl. ................................. 210/255; 210/330; 210/335; 210/389; 209/269; 209/314
[58] Field of Search ............... 210/255, 261, 262, 324, 210/330, 335, 337, 388, 389, 499; 209/269, 314

[56] References Cited

U.S. PATENT DOCUMENTS

| 511,949 | 1/1894 | Hayes | 210/335 |
|---|---|---|---|
| 2,158,169 | 5/1939 | Wright | 210/255 |
| 2,329,333 | 9/1943 | Carter | 209/314 |
| 2,408,558 | 10/1946 | Hutchison | 210/389 |
| 2,462,878 | 3/1949 | Logue | 210/389 |
| 2,677,463 | 5/1954 | Bolhar et al. | 210/389 |
| 4,082,657 | 4/1978 | Gage | 210/389 |
| 4,330,413 | 5/1982 | Wilson | 210/388 |

FOREIGN PATENT DOCUMENTS

| 0138479 | 4/1985 | European Pat. Off. . |
|---|---|---|
| 861747 | 2/1961 | United Kingdom . |
| 1251255 | 10/1971 | United Kingdom . |
| 2015367 | 9/1979 | United Kingdom . |
| 2055597 | 3/1981 | United Kingdom . |
| 2206502 | 1/1989 | United Kingdom . |

Primary Examiner—Stanley S. Silverman
Assistant Examiner—Christopher Upton
Attorney, Agent, or Firm—Lee, Mann, Smith, McWilliams & Sweeney

[57] ABSTRACT

A vibratory filtering screen assembly comprises an upwardly inclined member (12) on which is mounted the main filtering screen (14). At the exit (16) of the main screen is a secondary screen module (20) comprising a plurality of transverse supports (22) of rectangular section on which is mounted a screen (24) held in position by a silicon beading (26). Surrounding the secondary screen is a perimeter border or dam (28) for containing the discharge which is passed on to the secondary screen. In operation slurry is fed onto the main screen (12) where vibration passes it to exit (16). Wet solids components of the slurry drop into the secondary screen (20) where the vibration continues to dry out the solid particles, waste liquid being diverted away by a plate (30).

6 Claims, 2 Drawing Sheets

FILTERING SCREENS

FIELD OF THE INVENTION

This invention relates to filtering screens for use in filtering slurry discharges.

BACKGROUND TO THE INVENTION

In the filtering of a slurry, particularly in the oil industry, there is a constant need to reduce the liquid content of the solid discharge, eg of the drilling mud. Since much of this discharge contains oil contaminants, there is an ever increasing danger (in the present ecological climate of opinion) of polluting the environment with such discharges.

It is an object of the present invention to provide a filtering screen assembly which reduces the liquid content in the discharge.

SUMMARY OF THE INVENTION

According to the present invention there is provided a vibratory filtering screen assembly for filtering a slurry discharge comprising a secondary screen module mounted at the exit of the main screen and arranged to filter fluid from the discharge to further dry out the solid content thereof. Where the main screen is disposed in an upwardly inclined arrangement, in the direction of conveyance of the discharge, the secondary screen module may be mounted under the exit of the main screen and may also be at an inclined angle, typically parallel to the main screen.

The secondary screen module, which is preferably mounted on a removable carrier, may comprise a plurality of panel screens separated by transverse supports, the screening being held in position by silicon beading mounted across the width of the screen.

Secured around the secondary screen there may be positioned an upright border in the form of a dam extending around the periphery of the screen.

Under the secondary screen, and mounted on the frame of the main screen, there may be provided a divertor, allowing fluid discharge to be removed.

BRIEF DESCRIPTION OF THE DRAWINGS

The invention will now be described, by way of example only, with reference to the accompanying drawings in which.

DETAILED DESCRIPTION

Figure 1:
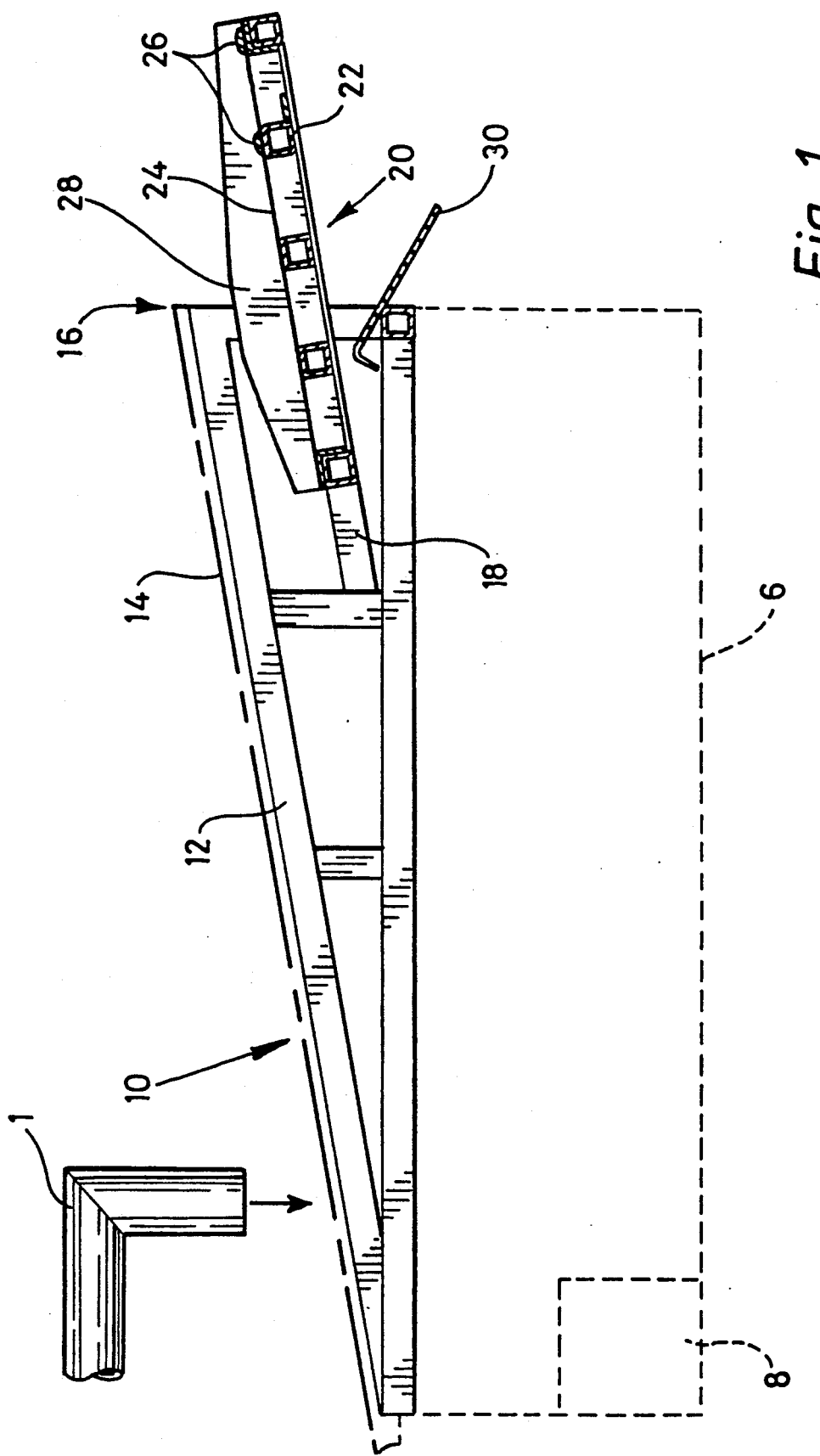
FIG. 1 is a sectional side view in elevation taken through a vibratory filtering screen assembly which incorporates a secondary screen module, and is in accordance with the invention.

Referring to FIG. 1, slurry to be filtered is conveyed to the assembly via a slurry feed conduit 1, the open end of which is positioned above the assembly.

The assembly comprises a generally rectangular frame 10, having a generally triangular section when viewed from the side. The frame 10 incorporates an upwardly inclined member 12 on which there is mounted the main filtering screen 14 having an upper end which constitutes an exit 16.

The frame 10 is, in turn, mounted on a machine frame 6 which houses a vibrator drive 8 operable to vibrate the frame 10, and hence the main filtering screen 14, in a known way. Such vibration of the frame 10 include a horizontal component of reciprocating motion which serves to cause any slurry on the screen 14 to travel upwardly along the incline towards the exit 16.

The frame 10 includes a pair of support members 18 which are parallel to the inclined member 12, and between which a secondary screen module indicated generally by the reference 20 is removably mounted. The secondary screen module 20 is so positioned relative to the unit 16 as to receive matter leaving the main screen 14 at the exit 16, and is mounted parallel with the main filtering a screen 14.

The secondary screen module 20 comprises a plurality of transverse supports 22 of rectangular section on which are mounted a plurality of panel screens one of which is referenced 24, held in position by a silicon beading 26. Surrounding the secondary screen is a perimeter wall 28 forming a dam for containing the discharge received by the secondary screen from the main screen.

Figure 2:
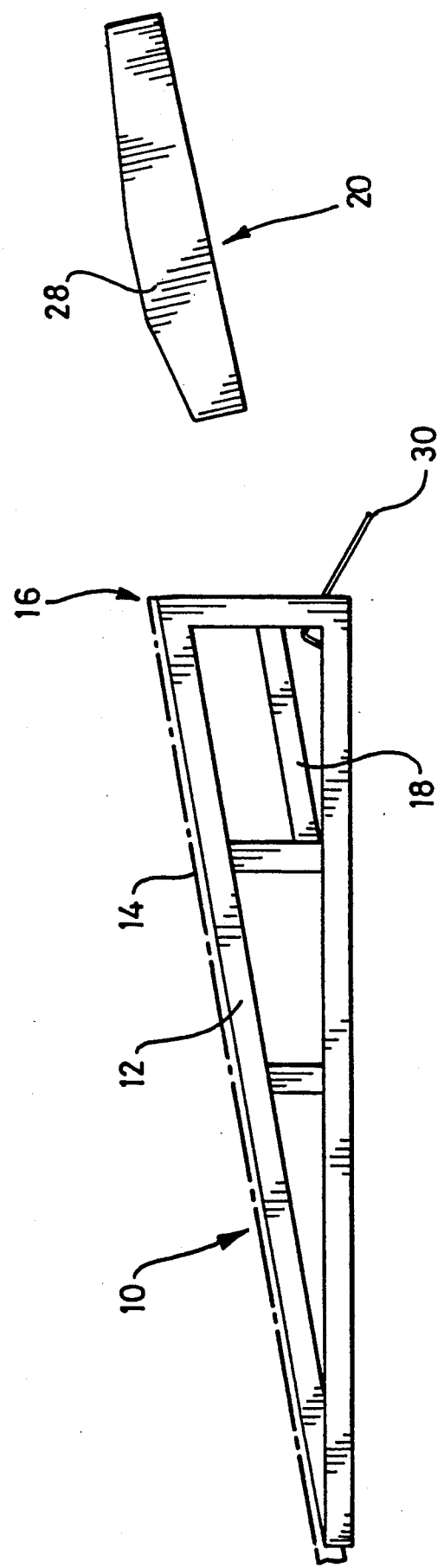
FIG. 2 is a similar view to FIG. 1, and shows part the assembly with the secondary screen separated from the main body of the assembly.

As can be seen from FIG. 2, the secondary screen module is removable from the members 18, and hence the main body of the assembly.

Mounted on the frame 10 below the secondary screen is a diverter plate 30, inclined downwardly away from the inclination of the secondary screen. The plate 30 serves to divert away waste liquid filtered by the secondary screen.

In operation, the slurry feed conduit 1 feeds slurry onto the main screen 14, which is vibrated by the vibrator drive 8 in such a way that the slurry travels towards the exit 16, the slurry is filtered by the screen 14 into a predominantly solid component and a predominantly fluid component. The predominantly fluid component drops through the mesh of the screen 14, whilst the predominantly solid component remains on the screen 14, and continues to travel towards the exit 16.

The screen 14 is thus upwardly inclined in the direction of conveyance of the predominantly solid component.

The predominantly solid component then drops from the exit 16 onto the secondary screen module 20, where the vibration continues to separate the fluid content from the predominantly solid component, drying-out the solid particles. The waste liquid filtered by the secondary screen module 20 is diverted away by the plate 30. It will be apparent from the above description that the secondary screen module reduces the wetness of the solid discharge enabling an improved filtering to take place in an economic manner.

We claim:

1. A vibratory filtering screen assembly for filtering a slurry discharge, the assembly comprising a combination of:

(i) a frame;
   (ii) a main screen, mounted on the frame, for filtering the discharge into a predominantly fluid component and a predominantly solid component, the main screen having an exit for the predominantly solid component;
   (iii) a secondary screen module so mounted below the exit as to receive the predominantly solid component, the said secondary screen module having a screen mesh arranged to filter fluid from the predominantly solid component to further dry-out the solid content thereof; and (iv) a plurality of spaced, laterally extending cross members on which the screen mesh of the secondary screen module is supported, wherein the main screen and the whole of the secondary screen module are upwardly inclined in the direction of conveyance of the predominantly solid component of the slurry across the said main screen, and there is provided a plurality of silicon beads, each of which overlies a cross member, extends across the width of the secondary screen module, and protrudes above the surface of the screen mesh of the secondary screen module.

2. An assembly as set forth in claim 1 in which the secondary screen module is parallel to the main screen.

3. An assembly as set forth in claim 1 in which the secondary screen module comprises:

i) a plurality of panel screens iii) The silicon beads holding the panel screens in position.

4. An assembly as set forth in claim 1 further comprising a wall secured to and extending around the secondary screen module, the said wall serving to form a dam around the periphery of the secondary screen module for containing the material received from the main screen.

5. An assembly as set forth in claim 1 further comprising a diverter plate, mounted on the said frame below the secondary screen module, onto which diverter plate fluid discharge filtered from the secondary screen module can fall.

6. An assembly as set forth in claim 1 in which the secondary screen module is removably mounted on the frame.

* * * * *